April 23, 1935.   A. H. MITTAG   1,998,939
CONTOURING DEVICE
Filed March 31, 1934
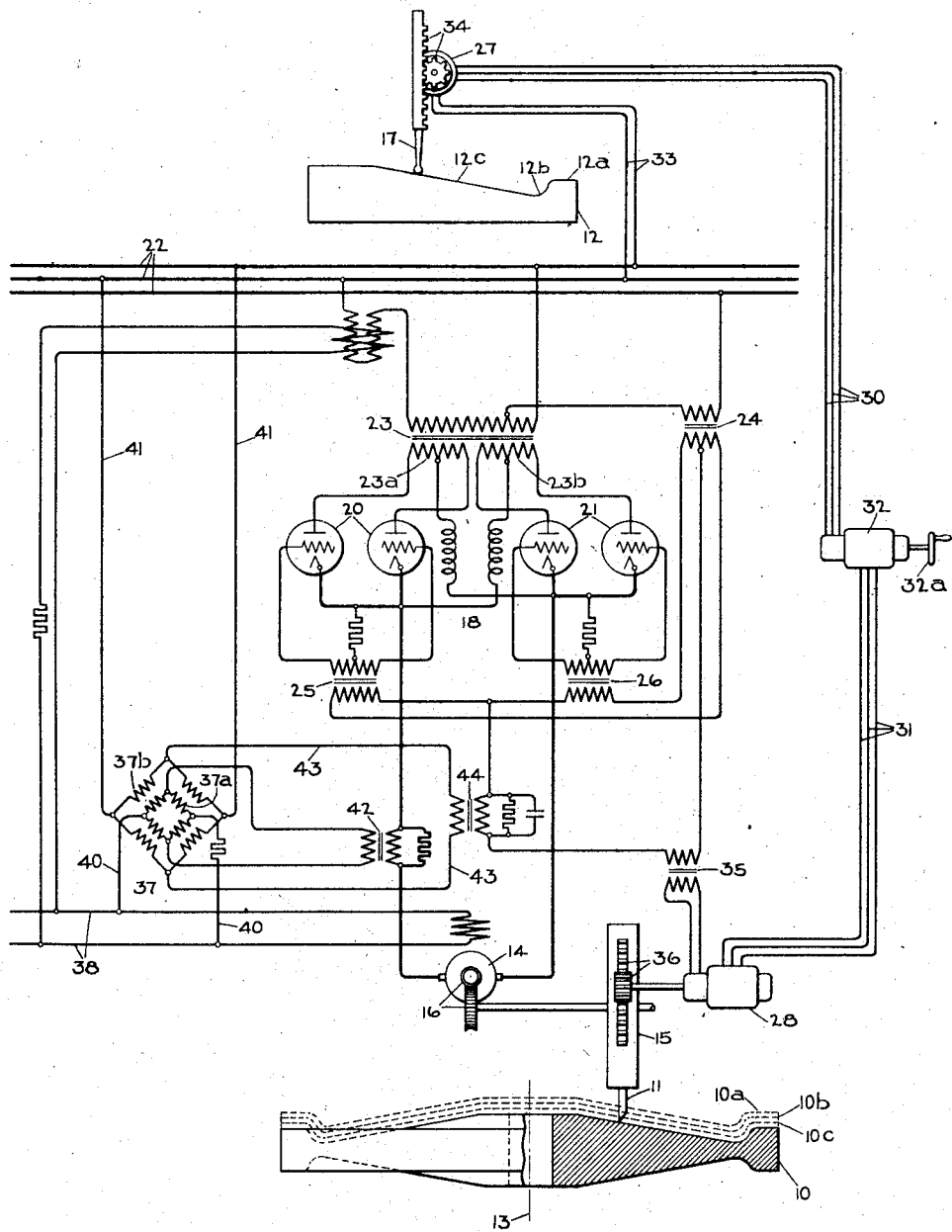
Inventor:
Albert H. Mittag,
by Harry E. Dunham
His Attorney.

Patented Apr. 23, 1935

1,998,939

UNITED STATES PATENT OFFICE 1,998,939

CONTOURING DEVICE

Albert H. Mittag, Schenectady, N. Y., assignor to General Electric Company, a corporation of New York Application March 31, 1934, Serial No. 718,393

5 Claims. (Cl. 90—24.4)

This invention relates to contouring apparatus and the like, and it has for an object the provision of a simple, reliable and improved apparatus of this character.

More specifically the invention relates to contouring apparatus in which a tool, driven by an electric motor is caused to follow the movement of the pilot device cooperating with a templet, and a specific object is the provision of means for causing the tool to take a plurality of roughing cuts of any desired depths in response to repeated movement of the pilot device over the templet.

In carrying the invention into effect in one form thereof, the tool is driven by an electric motor, which is controlled by a voltage transmitting device actuated by the pilot device and a voltage receiving device electrically connected to the transmitting device and mechanically connected to the tool. An electrical differential device is included in the connections between the transmitting and receiving devices to provide for control of the tool independently of the pilot device, thereby to provide for a plurality of parallel roughing cuts of any desired depths in response to repetition of the same movement of the pilot device over the templet.

In illustrating the invention, it is shown as applied only to the control of the vertical movement of the cutting tool. It will be understood, however, that if the templet is not located on the machine tool, a similar control may be applied to the horizontal movement of the cutting tool.

For a better and more complete understanding of the invention, reference should now be had to the following specification and to the accompanying drawing, the single figure of which is a simple diagrammatical representation of an embodiment of the invention.

Referring now to the drawing, a blank piece of work 10 is to be cut by means of the cutting tool 11 to the shape or contour of a templet 12. The piece of work 10 is rotated about its vertical axis 13 by any suitable driving means (not shown). A suitable driving means, illustrated as an electric motor 14, is provided for effecting the vertical movement of the tool 11. Although this motor may be of any suitable type, it is illustrated as a direct current motor and its shaft is connected to the tool holder 15 by suitable driving connections illustrated as worm gearing 16 and a rack and pinion (not shown) on the rear side of the tool holder. In order to control the vertical movement of the tool 11 in such a manner that the work piece 10 will be cut the same shape as that of the templet 12, a pilot device 17 engaging with the templet 12 is provided for controlling the energization of the tool driving motor 14. It will be understood, that in the case assumed for the purpose of illustration, the horizontal movements of the pilot device 17 and the tool 11 are both effected synchronously by any suitable well-known means such for example as a lead screw on the cutting machine or any other well-known driving means for effecting synchronous motion of two objects. Thus it is clear that in order to cut the work piece 10 to the pattern of the templet 12, it is only necessary to control the vertical movement of the tool 11 in correspondence with the vertical movement of the pilot device 17, while both the tool 11 and the pilot device 17 are being moved horizontally.

Current is supplied to the armature of the electric motor 14 from any suitable source of supply, such for example as the electric valve apparatus 18, illustrated as a pair of electric valves 20 for supplying current to the armature of the motor in one direction and a similar pair of electric valves 21 for supplying current to the armature of the motor in the reverse direction. Although these electric valves may be of any suitable type, they are preferably of the three-electrode type, into the envelope of which an ionizable medium such for example as mercury vapor, or other inert gas, is introduced after exhaust. The presence of the ionizable medium within the envelopes of these valves serves to convert the usual pure electron discharge into an arc stream thereby constituting the valves electrostatically or grid controlled arc rectifiers. Persons skilled in the art will understand that the average current flowing in the anode circuit of electric valves of this type can be controlled by varying the phase relationship between the grid and anode voltages. When the grid voltage is substantially in phase with the anode voltage, the average value of the anode current is maximum, whereas if the grid voltage is substantially 90° out of phase with the anode voltage, the current is substantially zero. For intermediate phase relationships, the anode current has corresponding intermediate values.

As shown, the electric valve apparatus 18 is supplied with alternating voltage from a suitable three-phase source, represented by the three supply lines 22, by means of a supply transformer 23, the primary winding of which is connected to the top and middle supply lines and the opposite terminals of one-half of the secondary winding 23a of which are respectively connected to the anodes of the pair of valves 20, whilst the opposite terminals of the other half of the secondary winding 23b are respectively connected to the anodes of the pair of valves 21.

The grids of the electric valve apparatus 18 are supplied with a bias alternating voltage derived from the source 22 by means of a bias transformer 24, and a pair of grid transformers 25 and 26, the primary windings of which are connected in series relationship with the secondary winding of the bias transformer 24. One terminal of the primary winding of the bias transformer 24 is connected to the lower supply line 22 whilst the opposite terminal of this primary winding is connected to an intermediate point of the primary winding of the supply transformer 23. The point of this intermediate connection on the primary winding of the supply transformer is so chosen that the bias voltage applied to the grid circuit of the electric valve apparatus will be sufficiently lagging with respect to the anode voltage to maintain both pairs of valves 20 and 21 substantially deenergized.

In order to energize one or the other of the pair of valves 20 or 21 so as to cause the motor 14 to raise or lower the tool 11 in correspondence with a like movement of the pilot device 17, an additional voltage or component voltage is supplied to the grid circuit of the electric valve apparatus, which voltage is controlled by the relative positions of the pilot device 17 and tool 11. This component voltage is so derived from the source 22 that it is substantially in phase with the anode voltage and it is supplied to the grid circuit in such a manner that it adds vectorially to the bias voltage supplied by the source 24. Thus, the actual grid voltage is the vectorial sum of the bias voltage, which lags the anode voltage, and a component voltage substantially in phase with the anode voltage. It will thus be clear that by varying the magnitude of the component voltage, the phase relationship of the actual or resultant grid voltage relative to the anode voltage can be varied and the average value of the current in the anode circuit which is supplied to the electric motor 14 can be correspondingly varied. It will also be understood that by reversing the phase of this component voltage, one pair of valves 20 or 21 is energized and the other pair is deenergized. The reason for this behavior is that the grid connections of the electric valve apparatus are so chosen that as the phase of the grid voltage of one pair of valves is advanced, the phase of the other pair of valves is retarded. Thus, by controlling the phase of the component voltage supplied to the grid circuit of the electric valve apparatus, one or the other of the pairs of valves 20, 21 is energized and current is supplied to the motor 14 in one direction or the other, depending upon which pair of valves is energized, thereby causing the motor itself to rotate in one direction or the other.

In order to control the energization of the electric valve apparatus, and consequently the movement of the tool 11 in accordance with the relative positions of the pilot device and the tool 11, control means are provided which are illustrated as comprising an induction voltage transmitting device 27, an induction voltage receiving device 28, electrically connected together by means of connections 30, 31 together with an electrical differential device 32 included in these connections. The devices 27, 28, and 32 are similar to devices utilized for the electrical transmission of motion, as described and claimed in the Hewlett and Willard Patent No. 1,612,117, dated December 28, 1926. In the present case, however, they are utilized not for transmitting motion but for controlling the magnitude and phase of the component voltage supplied to the grid circuit of the electric valve apparatus 18.

The transmitting device 27 is a rotary induction device having a rotor member provided with a single phase winding (not shown) and a poly-circuit stator winding which is physically similar to a poly-phase distributed alternating current winding. Similarly the receiving device 28 is a rotary induction device having a single phase rotor winding and poly-circuit distributed stator winding. The electrical differential device 32 is likewise a rotary induction device having a poly-circuit rotor winding (not shown) and a poly-circuit stator winding (not shown). Single phase alternating voltage in phase with the anode voltage of the electric valve apparatus 18 is supplied to the single phase rotor winding of the transmitting device 27 from the source 22, the top and middle supply lines of which are connected to the rotor winding of the transmitter by means of connections 33. The terminals of the stator winding of the transmitter 27 are connected to like terminals of the rotor winding of the differential device 32, the terminals of the stator winding of which in turn are connected by means of conductors 31 to like terminals of the stator winding of the receiving device 28.

When an alternating voltage is supplied to the rotor winding of the transmitting device 27, the current flowing in this winding produces an alternating magnetic field, the position of the axis of which depends upon the position of the axis of the rotor winding itself. This alternating magnetic field induces voltages in the poly-circuit stator winding which in turn are transmitted through the differential device 32 to the stator winding of the receiving device 28. The voltages induced in the stator winding of the transmitter 27 will of course be unbalanced depending upon the relative positions of the rotor and stator windings and similarly the voltages of the stator winding of the receiving device 28 will be correspondingly unbalanced. As a result, the current flowing in the poly-circuit stator winding of the receiver 28 will be unbalanced and will produce a magnetic field, the position of the axis of which is dependent upon the position of the axis of the rotor winding of the transmitting device 27.

The rotor of the transmitter 27 is connected by any suitable means illustrated as a rack and pinion connection 34 to the pilot device 17. It will thus be seen that vertical movement of the pilot device 17 effects rotation of the rotor winding of the transmitting device 27 and consequently produces a rotation of the axis of the magnetic field due to the stator winding of the receiving device 28. The terminals of the rotor winding of the receiving device 28 are connected through a transformer 35 to the grid circuit of the electric valve apparatus 18 and the rotor itself is mechanically connected by means of rack and pinion 36 to the tool holding ram 15. Initially the apparatus is so arranged that when the tool 11 is in a desired position of correspondence with respect to the position of the pilot device 17, the axis of the rotor winding of the receiving device 28 is at right angles with respect to the axis of the magnetic field of the stator winding, and consequently no voltage is induced in the rotor winding and and thus no component voltage is supplied to the grid circuit of the electric valve apparatus 18. Under this condition, the electric valve apparatus is deenergized and the tool driving motor 14 is at rest. Rotation of the rotor winding of the transmitting device 27 produces a rotation of the magnetic field of the stator winding of the receiving device 28 with the result that a component voltage is supplied to the grid circuit of the electric valve apparatus 18 of a polarity to energize one or the other of the pairs of electric valves 20, 21. Similarly, if the rotor of the transmitting device 27 is held stationary and the rotor of the differential device 32 rotated relatively to its stator, the magnetic field of the stator winding of the receiving device 28 is correspondingly rotated. Thus, it will be seen that the differential device 32 provides independent control of the movement of the tool 11 so that the latter can be raised or lowered independently of any movement of the pilot device 17.

Suitable anti-hunting means 37 are provided for stabilizing the operation of the system. Although the details of this anti-hunting device form no part of the present invention, it is briefly described as comprising a saturable core-type reactor having a direct current saturating winding 37a connected in the form of a bridge, and an alternating current reactance winding 37b also connected in the form of a bridge. Direct current of a predetermined value is supplied to opposite points of the direct current winding 37a from a suitable source represented by the supply line 38 to which the direct current winding is connected by means of connections 40. Alternating voltage is supplied to opposite bridge points of the alternating current winding 37b from the top and middle supply lines of the source 22 to which the alternating current winding is connected by means of conductors 41. The remaining pair of bridge points of the direct current winding 37a are connected to the armature circuit of the tool driving motor 14 through a transformer 42, whilst the remaining bridge points of the alternating current winding 37b are connected by means of conductors 43 through a transformer 44 to the grid circuit of the electric valve apparatus 18. Since the direct current saturating winding of the reactor is connected to the motor circuit through a transformer, it will be clear that the saturation of the device is controlled in accordance with the rate of change of current in the motor circuit and consequently a correction is introduced into the grid circuit of the electric valve apparatus which is proportional to this rate of change. This corrective factor introduced into the grid circuit effectually prevents hunting and thus stabilizes the operation of the system.

With the above understanding of the apparatus and its organization in the completed system, the operation of the system itself will readily be understood from the following detailed description.

In contouring operations of the type about to be described, it is frequently necessary to take several roughing cuts prior to the final finishing cut. Assuming the pilot device 17 and the tool 11 to be in a position to begin the first roughing cut represented by the dotted line 10a, the rotor of the receiving device 28 is at right angles with the axis of the magnetic field of the stator winding, and the electric valve apparatus 18 is deenergized and the tool driving motor 14 is at rest. As the tool 11 is advanced horizontally by the lead screw of the machine, the pilot device 17 is likewise advanced horizontally at the same rate. As the pilot device advances, it will move in a vertical direction either upwardly or downwardly depending upon the contour of the templet 12. For example, as the pilot device rides off the rim 12a of the templet it moves downwardly into the fillet 12b; this of course effects rotation of the rotor winding of the transmitting device and a corresponding rotation of the axis of the magnetic field of the stator winding of the receiving device 28. As a result a voltage is induced in the rotor winding of the receiving device which is supplied to the grid circuit of the electric valve apparatus 18. The polarity of this component voltage is such that one of the pairs of electric valves 20, 21 is energized. For the purpose of illustration, it is assumed that the polarity of this component voltage is such that the pair of valves 20 is energized and current is supplied to the electric motor 14 in such a direction as to cause the motor to move the tool 11 in a downward direction. However, since the rotor of the receiving device 28 is mechanically connected to the tool holding ram 15, this downward movement of the tool rotates the rotor of the receiving device toward a position of correspondence with respect to the rotor of the transmitting device, i. e. a position in which the axis of the rotor winding of the receiving device is again at right angles with the axis of the magnetic field of the stator winding. When this condition obtains, the component voltage applied to the grids of the electric valve 20 again becomes zero, the valves are deenergized and the motor 14 is brought quickly to rest.

In a similar manner, as the cut advances and the pilot device 17 starts to rise along the sloping portion 12c of the templet, the rotor of the transmitting device is rotated in the opposite direction, the phase of the component voltage supplied to the grid circuit of the electric valve apparatus 18 is reversed and the pair of valves 21 is energized to supply current to the armature of the tool driving motor 14 in the reverse direction. As a result, the motor 14 rotates in a direction to raise the tool 11 and simultaneously the rotor of the receiving device is rotated toward the position in which the axis of its winding is again at right angles with the axis of the magnetic field of the stator winding. Thus when the vertical position of the pilot device 17 is changed the vertical position of the tool 11 is likewise changed by an amount proportional to the change in the position of the pilot device. The operation continues until the cut is completed.

If the pilot device 17 and the tool 11 are merely returned to their initial positions and the machines again started, the above-described operation will be repeated, but no cut will be taken by the tool 11 since it will obviously be moved through the same path as that through which it was moved to take the first cut.

In order to take the roughing cut represented by the dotted line 10b, the rotor of the differential device 32 is rotated by means of the hand wheel 32a before the second roughing cut is started. This shifts the axis of the magnetic field of the stator winding of the receiving device 28 in such a direction as to energize the pair of electric valves 20 which in turn supply current to the tool driving motor 14 in a direction to cause the motor to lower the tool 11. As the tool 11 is lowered, the rotor of the receiving device is again rotated until the axis of its winding is at right angles with the new axis of the magnetic field of the stator winding. When this condition obtains, the component voltage supplied to the grid circuit of the electric valve 20 becomes zero, the valves are deenergized and the motor 14 comes to rest. Thus, the tool 11 is lowered by an amount proportional to the rotation of the rotor of the differential device 32. The tool 11 is now in a position to take the second roughing cut represented by the dotted lines 10b. The operation in taking this second roughing cut is in all respects identical with that previously described in connection with the first roughing cut. As illustrated, the second roughing cut 10b is made parallel to the first roughing cut 10a. In a similar manner, the third roughing cut and as many roughing cuts as desired may be taken prior to the actual finishing cut. When the roughing cuts are completed, the rotor of the differential device 32 is rotated until the tool 11 is in the exact position for the beginning of the final finishing cut. This cut is made in a manner identical with that already described.

It will thus be seen that the differential device 32 provides accurate graduated control of the roughing cuts and finishing cut. By properly choosing the amount of rotation of the rotor of the differential device, the roughing cut can be made as fine or coarse as desired.

Although in accordance with the provisions of the patent statutes this invention is described as embodied in concrete form, it will be understood that the apparatus and connections shown are merely illustrative and the invention is not limited thereto since alterations and modifications will readily suggest themselves to persons skilled in the art without departing from the true spirit of this invention or the scope of the annexed claims.

What I claim as new and desire to secure by Letters Patent of the United States is:

1. In a contouring device, a stationary templet, a movable pilot device cooperating with said templet, an electric motor for driving the tool, means for controlling said motor to cause the tool to follow the movements of said pilot device comprising electrical devices associated with said pilot device and tool and electrical connections between said devices, and an electrical differential device included in said connections to modify the control of said motor to cause said tool to take a plurality of successive parallel cuts at progressively differing points on the work.

2. In a contouring device, a stationary templet, a movable pilot device cooperating with said templet, an electric motor for driving the tool, means for controlling said motor to cause the tool to follow the movement of said pilot device comprising an electrical transmitting device associated with said pilot device, an electrical receiving device associated with said tool, electrical connections between said transmitting and receiving devices, and an electrical differential device included in said connections for modifying the control to control said motor to cause said tool to take a plurality of successive parallel cuts at progressively differing points on the work in response to repetition of the same movement of said pilot device over said templet.

3. Contouring mechanism comprising the combination with a tool and a stationary templet of a pilot device cooperating with said templet, an electric motor for driving said tool, supply means for said motor, means for controlling said motor to effect movement of said tool corresponding to the movement of said pilot device on said templet comprising a rotary induction voltage transmitting device connected to said pilot device, a rotary induction voltage receiving device connected to the tool, electrical connections between said devices, and a rotary induction differential device included in said connections for controlling the operation of said motor to provide a plurality of successive parallel cuts at progressively differing points on the work in response to repetition of the same movement of said pilot device on said templet.

4. Contouring apparatus comprising a stationary templet, a movable pilot device, an electric motor for moving the tool in correspondence with the movement of said pilot device on said templet, supply means for said motor comprising electric valve apparatus provided with a control grid, means for controlling the voltage of said grid comprising a rotary voltage transmitting device connected to be actuated by said pilot device, a rotary induction voltage receiving device mechanically connected to the tool and electrically connected to said grid, and electrical connections between said transmitting and receiving devices, and a differential rotary induction device included in said connections for controlling said motor to effect movement of the tool independently of movement of said pilot device thereby to provide a plurality of successive parallel cuts at progressively differing points in response to repetition of the same movement of said pilot device.

5. Contouring apparatus comprising a stationary templet, a movable pilot device cooperating with said templet, an electric motor for driving the tool, supply means for said motor comprising electric valve apparatus provided with a control grid, means for controlling the voltage of said grid to cause said motor to move the tool in correspondence with the movement of said pilot device comprising a transmitting rotary transformer having its rotor member connected to said pilot device, a receiving rotary transformer electrically connected to said grid and having its rotor member mechanically connected to the tool, electrical connections between said transformers, and a differential rotary transformer included in said connections for controlling said motor to effect movement of the tool independently of movement of said pilot device thereby to provide a plurality of successive cuts at progressively differing points on the work in response to repetition of the same movement of said pilot device.

ALBERT H. MITTAG.